UNITED STATES PATENT OFFICE.

MAX WEILER, OF ELBERFELD, GERMANY, ASSIGNOR TO FARBENFABRIKEN VORM.
FRIEDR. BAYER & CO., OF ELBERFELD, GERMANY, A CORPORATION OF GERMANY.

AURIN DYE.

978,799.      Specification of Letters Patent.      Patented Dec. 13, 1910.

No Drawing.      Application filed April 27, 1910. Serial No. 557,950.

*To all whom it may concern:*

Be it known that I, MAX WEILER, doctor of philosophy, chemist, citizen of the German Empire, residing at Elberfeld, Germany, have invented new and useful Improvements in a New Dye, of which the following is a specification.

My invention relates to the manufacture and production of new dyestuffs of the aurin series, which are obtained by condensing in the presence of oxidizing agents methylene oxycarboxylic acids, especially methylene-di-salicylic acid and methylene-di-ortho-cresotinic acid with phenols with which the condensation cannot take place in para-position to the hydroxyl-group.

The new dyes are dark powders soluble in dilute caustic soda lye generally with a red color, dyeing wool from acid baths generally from red to violet shades, which can be chromed on the fiber.

In order to illustrate the new process more fully the following example is given, the parts being by weight:—12.2 parts of methylene-di-ortho-cresotinic acid and 6 parts of para-cresol are stirred at from 20–45° C. together with 180 parts of a strong sulfuric acid and the necessary quantity of nitrosyl sulfuric acid until the quantity of the dyestuff produced does no longer increase and the evolution of nitrogen oxids ceases. The product of the reaction is poured on ice and the dyestuff is filtered off. It is a reddish-brown powder which dyes wool red which turn intense blue-violet on chroming.

Other oxidizing agents such as nitric acid, nitro-compounds, concentrated or fuming sulfuric acid may be used. Methylene-di-salicylic or methylene-di-2.4-dioxybenzoic acid, etc., or mixed methanes can be used instead of methylene-di-ortho-cresotinic acid and other of the above mentioned phenols may be employed, *e. g.* para-chlorophenol, 4.6 dibrom. 3. methylphenol para-cresotinic acid, para-chloro-salicylic acid, 2-naphthol-3.6-disulfonic acid, 2-naphthol-carboxylic acids 2-naphthol 3 carboxy 6 sulfoacid, 2 naphthol 3 carboxy 8 sulfoacid etc.

The new dyestuffs can also be dyed on chromed wool or on wool together with chromium compounds.

I claim:—

1. The herein described new dyestuffs obtainable from methylene oxycarboxylic acids and phenols in which the para position to the hydroxyl group is substituted, which dyestuffs are dark powders soluble in dilute caustic soda lye generally with a red color, dyeing wool from acid baths generally from red to violet shades, which can be chromed after dyeing, substantially as described.

2. The herein described new dyestuff obtainable from methylene-di-ortho-cresotinic acid and para-cresol, which is a reddish-brown powder soluble in caustic soda lye with a red color, dyeing wool red shades, which turn intense blue-violet on chroming, substantially as described.

In testimony whereof I have hereunto set my hand in the presence of two subscribing witnesses.

MAX WEILER.

Witnesses:
    OTTO KÖNIG,
    WALTER VONNEGUT.